3,122,587
PROCESS OF PRODUCING 6-HALO-2,5-
DIMETHYLHEXANONE-3
Harry A. Stansbury, Jr., South Charleston, and Howard R.
Guest, Charleston, W. Va., assignors to Union Carbide
Corporation, a corporation of New York
No Drawing. Filed Nov. 13, 1959, Ser. No. 852,601
4 Claims. (Cl. 260—593)

This invention is concerned with a novel process for producing new compositions of matter comprising halogenated aliphatic ketones and their derivatives by an unexpected rearrangement of 2,5-dimethyltetrahydropyran-2-methanol.

At present, there are two established general methods for the preparation of halogenated ketones. The first method is by direct halogenation of a ketone which results in the preferential introduction of halogen in the alpha position as illustrated below:

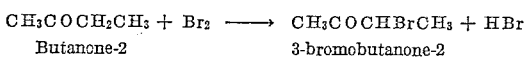

The second method involves the reaction of a concentrated hydrohalic acid with a ketone as illustrated by the following equation:

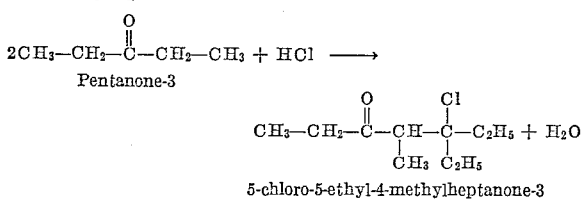

Applicants have found that halogenated aliphatic ketones can be produced in excellent yields by a novel process involving the reaction of hydrohalic acids with: 2,5-dimethyltetrahydropyran-2-methanol. The pyran compound can be prepared by the catalytic hydrogenation of the methacrolein dimer.

The process by which the halogenated aliphatic ketones may be produced is illustrated by the following equation:

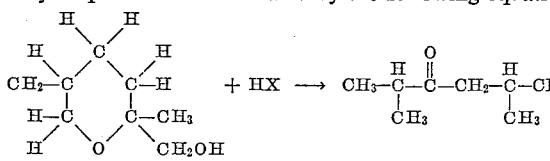

wherein X is a halogen.

This reaction involves a unique and totally unexpected rearrangement. On the basis of prior knowledge, one would most likely predict that the rearrangement reaction would form 6-halo-2,5-dimethylhexaldehyde. While the mechanism for the production of these haloketones is not understood, applicants have observed that their novel rearrangement reaction does not occur when tetrahydropyran-2-methanol itself is heated with either hydrochloric acid or hydrobromic acid. Apparently, an alkyl group such as the methyl group must be in the 2 and 5 positions before the rearrangement reaction will occur.

This novel process is an improvement over the known methods for the production of halogenated ketones since it yields ketones in which the halogen atom is both primary and in the gamma position relative to the carbonyl group. Such halogenated ketones cannot be prepared by either of the two methods described hereinabove, i.e., halogenation of ketones or reaction of hydrohalogen acids with ketones. To our knowledge, the 6-halo-2,5-dimethyl-3-hexanones can only be produced by our method.

Applicants' halogenated ketones are more stable than those of the prior art because the primary halogen in the gamma position is not activated by the carbonyl group. On the other hand, the prior art compounds have halogen in either the alpha or beta position where the carbonyl group will greatly increase the reactivity of the halogen. In fact, applicants' novel ketones can be stored for months in clear glass exposed to the normal amount of light. On the other hand, chloroacetone is unstable in the presence of light. The preferred procedure for the chlorination of acetone to form chloroacetone involves the addition of chlorine to a mixture of ten parts of marble (a form calcium carbonate) and 40 parts of acetone while 18 to 20 parts of water are fed. Condensation products are formed if the marble is omitted and purification of the chloroacetone also becomes difficult. In contrast, applicants' novel ketones do not require a stabilizer during storage and the presence of marble is not desirable during their preparation.

The halodimethylhexanones produced by this novel rearrangement reaction are new compounds which are useful as solvents and dispersants for resins and also as ore extractants. Furthermore, the ketones are intermediates for the synthesis of other oxygenated compounds.

In practicing applicants' novel rearrangement reaction, it is preferable to have the hydrogen halide in relatively concentrated aqueous solution, with concentrations of 20% to 60% by weight being preferred. Reaction will occur under anhydrous conditions or in acid concentrations less than 20 percent, such as 10 percent; but such reaction is slow or incomplete. The temperature required for the reaction is in the range of 70° C. to 200° C., with 110° C. to 170° C. being preferred. The process is slow or incomplete at temperatures below 70° C. while above 200° C. much tarry material is produced. The molar ratio of the hydrogen halide to the saturated pyran alcohol may be varied from 2 moles to 20 moles with 8 to 12 moles being the preferred range. The preferred acids are hydrochloric and hydrobromic acid. The pressure requirements are within a wide range of from about 150 pounds p.s.i. absolute to about 5 pounds p.s.i. absolute; with about 15–20 pounds p.s.i. absolute being preferred.

The 6-halo-2,5-dimethylhexanone-3 may be converted to its corresponding alcohol, namely, 6-halo-2,5-dimethylhexanol-3, by reduction with such materials as lithium aluminum hydride, aluminum isopropoxide, and sodium borohydride. This reaction takes place at a wide range of temperatures with 25–40 degrees centigrade being preferred.

Both the halogenated ketones and alcohols of this invention are water-insoluble and may be employed as ore extractants. The alcohols also have utility as chemical intermediates and may be reacted with an inorganic hydroxide such as sodium or potassium hydroxide, at temperatures of 20° C. to 150° C. to produce 2-isopropyl-4-methyltetrahydrofuran. The preferred temperature range is 80° C. to 110° C. The concentration of the hydroxide in the water is not critical, although the range of 5 to 20 percent by weight of hydroxide in water is preferred.

The 2-isopropyl-4-methyltetrahydrofuran formed by the above-described reaction, like tetrahydrofuran, may be used as a resin solvent. The substituted tetrahydrofuran of this invention has a higher boiling point than tetrahydrofuran and thus may be used to advantage, in combination with tetrahydrofuran, as a lacquer thinner. The extended drying time provided by the different rates of evaporation of the two compounds permits more thorough solvent removal and results in a coating that is less likely to blister than if only a one-component solvent was used. Furthermore, 2-isopropyl-4-methyltetrahydrofuran has utility as a monomer since it may be polymerized to useful resins in a manner similar to the tetrahydrofuran polymerization disclosed in United States Patent No. 2,691,038. The polymers so formed may be used as lubricants.

The 6-halo-2,5-dimethylhexanone-3 may also be reacted with a strong base such as sodium hydroxide or potassium hydroxide to produce isopropyl 2-methylcyclopropyl ketone. This reaction may be conducted at temperatures of about 20° C. to 150° C. The preferred temperature range being 80° C. to 110° C. This ketone is a useful resin solvent. It has a fragrant odor reminiscent of both menthol and peppermint and thus has utility as an odorant. Such odorants are useful when formulated in soaps, perfumes and lotions. They also may be placed in open or wick-type containers to give rooms a fragrant odor. The isopropyl 2-methylcyclopropyl ketone may be reduced with compounds such as lithium aluminum hydride, aluminum ispropoxide and sodium borohydride to produce isopropyl-2-methylcyclopropyl carbinol. This fragrant alcohol has utility as an odorant and may be placed in open or in wick type containers to give rooms a fragrant odor.

The structures of the novel compounds of this invention were determined experimentally via the oxidation of the isopropyl 2-methylcyclopropyl ketone and the degradation of the oxidation product. Using the method of Emmons and Lucas [J. Am. Chem. Soc., 77, 2287 (1955)], a solution of peroxytrifluoroacetic acid was prepared by dropwise addition of 50.8 ml. (0.36 mole) of trifluoroacetic anhydride to a suspension of 8.2 ml. (0.30 mole) of 90 percent hydrogen peroxide in 50 ml. of cold methylene chloride. This solution was then added over a twenty minute period to a stirred suspension of 130 grams (0.92 mole) of dry, finely ground disodium hydrogen phosphate in a mixture of 150 ml. of methylene chloride and 26 grams (0.20 mole) of isopropyl 2-methylcyclopropyl ketone. The exothermic reaction caused the solution to boil. After the solution was refluxed for one hour, the insoluble salts were collected by filtration and washed with 100 ml. of methylene chloride. The filtrates were combined and washed with 100 ml. of 10 percent sodium carbonate solution and dried over magnesium sulfate. The dry solution was distilled to obtain 20.4 grams (72 percent yield) of isopropyl 2-methylcyclopropanecarboxylate having a boiling range of 153–158° C. at atmospheric pressure.

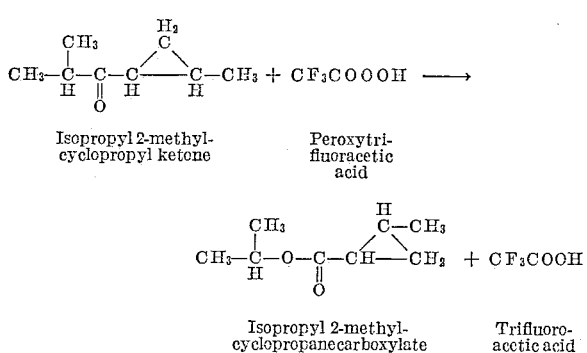

A solution of 3.16 grams (0.022 mole) of the isopropyl 2-methylcyclopropanecarboxylate prepared as above in 25 ml. of anhydrous ethyl ether was added dropwise to a slurry of 0.7 gram of lithium aluminum hydride in 75 ml. of anhydrous ethyl ether, with immediate refluxing occurring. After the addition was complete, the mixture was refluxed for one hour. The excess lithium aluminum hydride was reacted with a saturated solution of sodium sulfate. The ether solution was distilled to obtain 0.7 gram of isopropanol (boiling range 85–87° C.) and 1.5 grams of 2-methylcyclopropylcarbinol (boiling range 118–120° C., 78 percent yield).

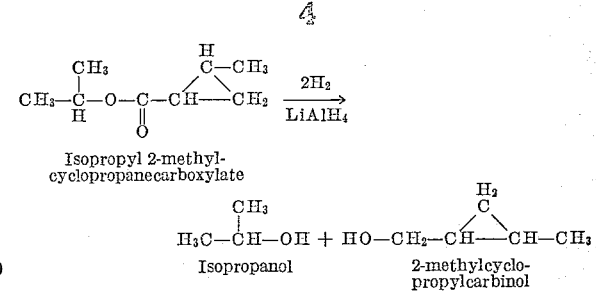

The infrared spectrum of the isopropanol obtained by the above reaction was identical to that of an authentic sample of isopropanol, while the infrared absorption spectrum of the 2-methylcyclopropylcarbinol as obtained above was identical to that of an authentic sample of 2-methylcyclopropylcarbinol synthesized by an independent method.

A mixture of 2 ml. of isopropyl 2-methylcyclopropylcarboxylate prepared by the first-described reaction, 1.5 grams of 3,5-dinitrobenzoic acid and 2 drops of concentrated sulfuric acid was heated at 150° C. for an hour. The mixture was cooled, diluted with 25 ml. of ethyl ether and extracted twice with 15 ml. portions of 5 percent sodium carbonate solution to remove acids. The ether layer was washed with water and the solvent was evaporated. The residue was crystallized from water-ethanol mixture to obtain isopropyl 3,5-dinitrobenzoate, M.P. 121–122° C. The mixed M.P. with an authentic sample of isopropyl 3,5-dinitrobenzoate was undepressed.

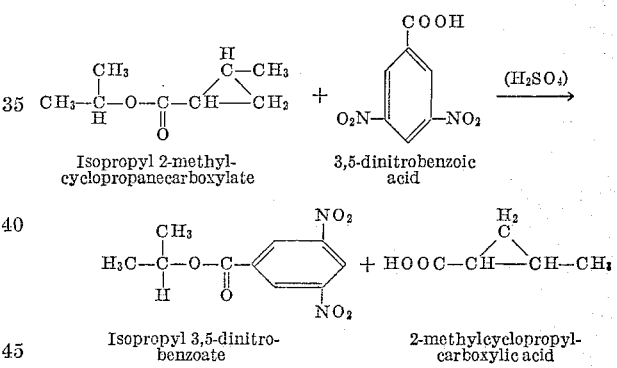

Six grams (0.042 mole) of isopropyl 2-methylcyclopropanecarboxylate, prepared as described above, was refluxed for 2.5 hours with excess ethanolic sodium hydroxide. The alcohol was distilled off and the residue was acidified and extracted with ethyl ether. The extract was distilled to obtain 2.7 grams of 2-methylcyclopropanecarboxylic acid (65.5 percent yield) having a boiling range of 87–92° C. at a pressure of 12 mm. of mercury.

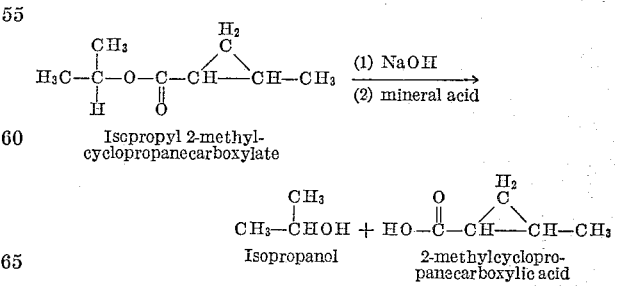

A comparison of the infrared spectrum of the acid obtained by the above reaction with that of a known sample of 2-methylcyclopropanecarboxylic acid showed them to be identical.

The above experimental data is believed to have definitely established the structures of the novel compounds of this invention. Infrared absorption studies and mass-spectrographic analyses of samples of these new compounds verified the assigned structures.

EXAMPLE 1

*Preparation of 6-Chloro-2,5-Dimethylhexanone-3*

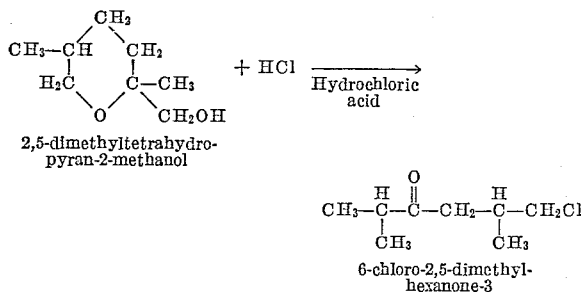

A mixture of 576 grams of 2,5-dimethyltetrahydropyran-2-methanol (4 moles) and 3400 milliliters of 37 percent hydrochloric acid (40 moles) was heated at 170° C. in a glass-lined autoclave for 15 minutes. The oil (top) layer (504 grams) was separated and distilled to obtain 6-chloro-2,5-dimethylhexanone-3 having these properties: boiling point 49° C. at 1 millimeter of mercury pressure; refractive index of $n\ 30/D\ 1.4397$; specific gravity at 20/20° C. of 0.984; 22.1 percent chlorine (theoretical 21.8%); 58.7 percent carbon (theoretical 59.1 percent); 9.2 percent hydrogen (theoretical 9.2 percent); 169 molecular weight by the Menzies-Wright method (theoretical 162.5). This new ketone was produced with 41 percent yield and efficiency based on the 2,5-dimethyltetrahydropyran-2-methanol.

EXAMPLE 2

*Preparation of 6-Chloro-2,5-Dimethylhexanone-3*

A mixture of 148 pounds of 37 percent hydrochloric acid (1.5 moles) and 21.6 pounds of 2.5-dimethyltetrahydropyran-2-methanol (0.15 mole) was refluxed at 25 pounds p.s.i.g. (40 pounds p.s.i. absolute) while taking off oil (top) layer of the distillate through a decanter and returning the aqueous layer to the kettle. After 2.5 hours of operation at a kettle temperature of about 140° C. and a head temperature of 135° C. the operation was interrupted. The collected oil (11.3 pounds) was distilled to find that it was 92.7 percent 6-chloro-2,5-dimethylhexanone-3. The yield and efficiency was 43 percent based on the ring alcohol.

EXAMPLE 3

*Preparation of 6-Bromo-2,5-Dimethylhexanone-3*

A mixture of 144 grams of 2,5-dimethyltetrahydropyran-2-methanol (1 mole) and 1162 milliliters of 47 percent hydrobromic acid (10 moles) was stirred and refluxed at 120 degrees centigrade for an hour. The oil (top) layer was separated and the aqueous layer was extracted 3 times with 100 cubic centimeter portions of chloroform. The oil and extracts were combined and distilled to obtain 6-bromo-2,5-dimethylhexanone-3 having these properties; boiling range 74–80 degrees centigrade at 3 millimeters of mercury pressure; refractive index of $n\ 30/D\ 1.4601$; specific gravity at 20/20 degrees centigrade of 1.223; 68.1 percent bromine (68.3 percent theoretical). The yield was 38 percent based on the ring alcohol.

EXAMPLE 4

*Preparation of Isopropyl 2-Methylcyclopropyl Ketone*

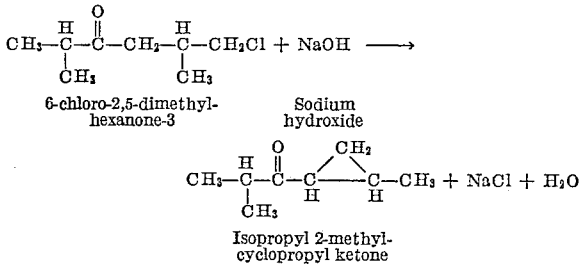

A mixture of 162.5 grams of 6-chloro-2,5-dimethylhexanone-3 (1 mole) and a solution of 46 grams of 95 percent sodium hydroxide (1.1 moles) in 414 milliliters of water was stirred and refluxed at 100 degrees centigrade for 2.5 hours. The mixture was cooled to 25 degrees centigrade and the layers were separated. The aqueous layer (481 grams) was found by analysis to contain 0.95 mole of sodium chloride (95 percent of the theoretical amount). The aqueous layer was extracted with 100 milliliters of isopropyl ether. The extract was combined with the oil layer (126 grams) and distilled to obtain isopropyl 2-methylcyclopropyl ketone having these properties: boiling point 46 degrees centigrade at 10 millimeters of mercury pressure; refractive index of $n\ 30/D\ 1.4260$; specific gravity at 20/20 degrees centigrade of 0.870; 130 molecular weight by the freezing point method (theoretical 126); 94.4 percent purity by ketone analysis with hydroxylamine; 75.4 percent carbon (theoretical 76.1 percent); 11.0 percent hydrogen (theoretical 11.1 percent) nil hydroxyl by analytical acylation and nil unsaturation toward bromine solution. This fragrant ketone was produced in 91 percent yield based on the chloroketone.

EXAMPLE 5

*Preparation of Isopropyl 2-Methylcyclopropylcarbinol*

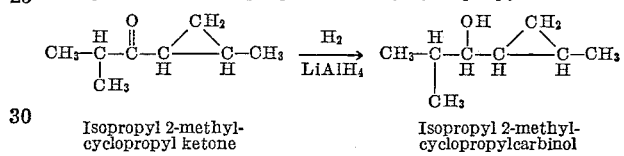

A solution of 9.5 grams of lithium aluminum hydride (0.25 mole) in 300 milliliters of diethyl ether was stirred at 30–35 degrees centigrade while 110 grams of isopropyl 2-methylcyclopropyl ketone (0.87 mole) were fed over a period of an hour. After a reaction period of 10 minutes, 50 milliliters of water were fed over a period of 15 minutes to destroy excess hydride. The mixture was poured into 100 milliliters of ice water and then treated with 500 milliliters of 10 percent sulfuric acid. The aqueous layer was separated and extracted twice with 100 milliliter portions of diethyl ether. The extracts were combined and fractionated to obtain isopropyl 2-methylcyclopropylcarbinol having the following properties: boiling point 38 degrees centigrade at 3 millimeters of mercury pressure; refractive index of $n\ 30/D\ 1.4330$; specific gravity at 20/20° centigrade of 0.864; 91 percent purity by analytical acylation. The yield of this new, fragrant alcohol was 81 percent.

EXAMPLE 6

*Preparation of 6-Chloro-2,5-Dimethylhexanol-3*

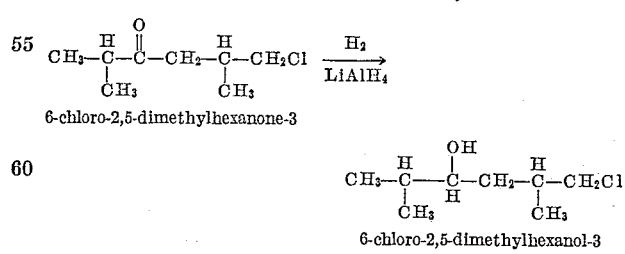

A solution of 9.5 grams of lithium aluminum hydride (0.25 mole) in 300 milliliters of diethyl ether was stirred at 30–37 degrees centigrade while 141 grams of 6-chloro-2,5-dimethylhexanone-3 (0.87 mole) were fed over a period of 40 minutes. After a reaction period of 10 minutes, 50 milliliters of water were fed slowly to decompose the excess hydride. The mixture was poured into 100 milliliters of ice-water and then treated with 500 milliliters of 10 percent sulfuric acid. The aqueous layer was separated and extracted twice with 100 milliliter portions of diethyl ether. The extracts were combined, dried over anhydrous sodium sulfate, and distilled to obtain 6-chloro-2,5-dimethylhexanol-3 having these properties: refractive index of $n$ 30/D 1.4505; specific gravity at 20/20° centigrade of 0.985; 94 percent purity by analytical acetylation with acetic anhydride-pyridine mixture. The yield of this new chlorohydrin was 88 percent based on the chloroketone.

EXAMPLE 7

*Preparation of 2-Isopropyl-4-Methyltetrahydrofuran*

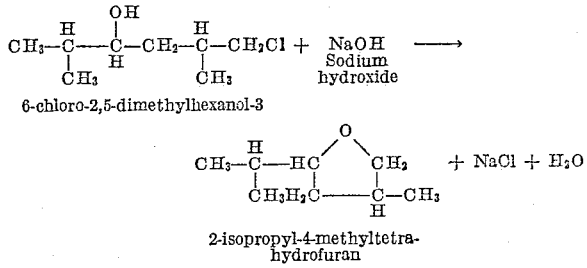

A mixture of 75 grams of 6-chloro-2,5-dimethylhexanol-3 (0.456 mole) and a solution of 21 grams of sodium hydroxide (95 percent, 0.5 mole) in 179 milliliters of water was stirred and refluxed at 99 degrees centigrade for two hours. After the mixture was cooled to 25 degrees centigrade, the aqueous layer was separated and extracted twice with 50 milliliter portions of isopropyl ether. The oil (60 grams) and extracts were combined and fractionated to obtain 2-isopropyl-4-methyltetrahydrofuran having these properties: boiling point, 33 degrees centigrade at 10 millimeters of mercury pressure; refractive index of $n$ 30/D 1.4165; specific gravity at 20/20° C. of 0.842; contained no hydroxyl, no carbonyl and no unsaturation by standard analytical methods. The yield of this new compound was 91 percent based on the chlorohexanol compounds.

EXAMPLE 8

*Solubility of Various Resins in 6-Chloro-2,5-Dimethylhexanone-3*

A number of different synthetic resins and surface protective materials were tested for their ability to form 20% solids solutions in 6-chloro-2,5-dimethylhexanone. Mixing was accomplished by weighing the solid and liquid into small glass bottles, agitating them vigorously on a paint shaking machine, and allowing them to roll 16 hours on a can rolling machine. The contents of each bottle was then examined for solubility. The results of this example appear in Table A.

TABLE A

| Material | Solubility |
|---|---|
| 1. Vinyl chloride-vinyl acetate copolymer containing 86.7% vinyl chloride. | Completely soluble, very viscous. |
| 2. Poly(vinyl acetate) | Completely soluble. |
| 3. Poly(vinyl chloride) [1] | Forms a suspension. |
| 4. Phenolic resin, non-heat-hardening type. | Completely soluble. |
| 5. Epoxy resin | Do. |
| 6. Polystyrene resin | Do. |
| 7. Styrene-butadiene copolymer | Do. |
| 8. Methyl methacrylate resin | Completely soluble, very viscous. |
| 9. Acrylic resin | Completely soluble. |
| 10. Terpene resin (Piccolyte S-100) | Do. |
| 11. Wood resin, Grade FF | Do. |

[1] 10% solids mixture.

EXAMPLE 9

*Solubility of Various Resins in Isopropyl 2-Methylcyclopropyl Ketone*

A number of synthetic resins and surface-protective materials were tested for their ability to form solutions in isopropyl 2-methylcyclopropyl ketone. The materials were mixed by weighing the solid and liquid into small glass bottles, agitating them vigorously on a paint shaking machine, and allowing them to roll 16 hours on a can rolling machine. The solutions were then examined for their characteristics. The results of this example appear in Table B.

TABLE B

| Material | Solubility |
|---|---|
| 1. Vinyl chloride-vinyl acetate copolymer containing 86.7% of vinyl chloride. | Completely soluble, fluid solution. |
| 2. Poly(vinyl acetate) | Do. |
| 3. Poly(vinyl chloride) [1] | Forms a suspension. |
| 4. Phenolic resin, non-heat-hardening. | Completely soluble, fluid solution. |
| 5. Epoxy resin | Do. |
| 6. Vinylidene chloride resin | Thick solution with slight haze of either contamination or small insoluble fraction of resin. |
| 7. Polystyrene resin | Completely soluble, fluid solution. |
| 8. Ethyl cellulose resin | Fluid solution with faint haze of either contamination or small insoluble fraction of resin. |
| 9. Terpene resin (Piccolyte S-100) | Completely soluble, fluid solution. |
| 10. Petroleum resin (Piccopale 100) | Do. |
| 11. Cellulose acetate-butyrate resin AB-500-1 (Eastman Chemical). | Moderately thick solution, trace of insoluble matter. |
| 12. Styrene-butadiene copolymer | Completely soluble, fluid solution. |
| 13. Wood resin, Grade FF | Do. |

[1] 10% solids.

EXAMPLE 10

*The Use of 6-Chloro-2,5-Dimethylhexanone-3 As an Ore Extractant*

Fifty mls. of a hydrofluoric acid solution having a pH of 1.0 to 2.0 and containing 130 g./l. $Ta_2O_5$, 150 g./l. $Cb_2O_5$, 33.0 g./l. $Fe_2O_3$, and 33.0 g./l. $TiO_2$ were contacted with 50 mls. of 6-chloro-2,5-dimethylhexanone-3. Analysis of the aqueous and organic phases after contact, percent of the oxides extracted, and the separation factor for columbium and tantalum are given below:

| Oxide | Organic Phase, g./l. | Aqueous Phase, g./l. | Percent Oxide Extracted |
|---|---|---|---|
| $Ta_2O_5$ | 48.0 | 79.0 | 38.0 |
| $Cb_2O_5$ | 0.8 | 148.0 | 0.55 |
| $Fe_2O_3$ | 0.08 | 31.0 | 0.26 |
| $TiO_2$ | 0.5 | 31.0 | 1.6 |

Separation factor: $K_{ta}/K_{cb}=111$.

An identical experiment as that of Example 10 but using methylisobutyl ketone as the organic extractant was made to compare it with 6-chloro-2,5-dimethylhexanone-3. The solubility of the aqueous phase in the organic phase, the separation factors obtained, and the percent extraction of tantalum and columbium using the two ketones are compared below:

| | Separation Factor: $K_{ta}/K_{cb}$ | Percent Extraction | | Percent Solubility |
|---|---|---|---|---|
| | | Ta | Cb | |
| 6-chloro-2,5-dimethylhexanone-3 | 111 | 38 | 0.55 | 0 |
| Methyl isobutyl ketone | 204 | 97 | 6.4 | 10 |

The results of these tests show that tantalum is preferentially extracted from a hydrofluoric acid solution containing tantalum, columbium, titanium and iron by 6-chloro-2,5-dimethylhexanone-3. The new ketone has practically no solubility in the aqueous phase. This is a definite advantage in ore extraction over other ketone compounds such as the methyl isobutyl ketone.

This application is a continuation-in-part of Serial No. 696,331, filed November 14, 1957, now abandoned.

What is claimed is:

1. The process of producing 6-halo-2,5-dimethylhexanone-3 compounds which comprises the step of reacting at a temperature of from 70° C. to 200° C. 2,5-dimethyltetrahydropyran-2-methanol with an aqueous solution of a hydrohalic acid selected from the group consisting of hydrochloric acid and hydrobromic acid.

2. The process of claim 1 wherein the hydrohalic acid is hydrochloric acid.

3. The process of claim 1 wherein the hydrohalic acid is hydrobromic acid.

4. The process of producing 6-halo-2,5-dimethylhexanone-3 compounds which comprises reacting 2,5-dimethyltetrahydropyran-2-methanol at temperatures of 70–200 degrees centigrade with an aqueous solution of a hydrohalic acid selected from the group consisting of hydrobromic and hydrochloric acid wherein the hydrogen halide is in a concentration of 20–60 percent by weight of the solution.

References Cited in the file of this patent

UNITED STATES PATENTS

| | | |
|---|---|---|
| 2,204,135 | Jones | June 11, 1940 |
| 2,211,119 | Hixson et al. | Aug. 13, 1940 |
| 2,251,895 | Reppe et al. | Aug. 5, 1941 |
| 2,366,464 | Wilson | Jan. 2, 1945 |
| 2,370,392 | Boon | Feb. 27, 1945 |
| 2,714,121 | Anderson et al. | July 26, 1955 |
| 2,750,428 | Bavley et al. | June 12, 1956 |
| 2,767,047 | Wilhelm et al. | Oct. 16, 1956 |
| 2,790,004 | Dougherty | Apr. 23, 1957 |
| 2,802,880 | Stoll et al. | Aug. 13, 1957 |
| 2,812,352 | Freerks et al. | Nov. 5, 1957 |
| 2,812,361 | Surmatis | Nov. 5, 1957 |
| 2,967,197 | Crosby et al. | Jan. 3, 1961 |

OTHER REFERENCES

Beilstein: Organische Chemie, vol. I (1st supplement), page 364 (1928).

Normant: Chem. Abstracts, vol. 46, page 5036 (1952).